United States Patent [19]

Gilovich et al.

[11] 4,354,211

[45] Oct. 12, 1982

[54] MAGNETIC TAPE APPARATUS

[75] Inventors: Paul A. Gilovich, Saratoga; James S. Toreson, Mountain View, both of Calif.

[73] Assignee: Microcomputer Systems Corporation, Sunnyvale, Calif.

[21] Appl. No.: 151,394

[22] Filed: May 19, 1980

[51] Int. Cl.³ .............................................. G11B 5/08
[52] U.S. Cl. .................................... 360/84; 360/109; 360/85
[58] Field of Search .................... 360/84–85, 360/104–109, 130.22–130.24

[56] References Cited

U.S. PATENT DOCUMENTS

| 3,961,369 | 6/1976 | Baumann et al. | 360/84 |
| 4,104,685 | 8/1978 | Chang | 360/84 |
| 4,203,140 | 5/1980 | Watanabe | 360/109 X |
| 4,212,042 | 7/1980 | Koshelev et al. | 360/108 |

Primary Examiner—John H. Wolff
Attorney, Agent, or Firm—Flehr, Hohbach, Test, Albritton & Herbert

[57] ABSTRACT

A magnetic tape apparatus is disclosed herein and comprises a drum, means for supporting and rotating the drum, at least one transducer extending past the surface of said drum adapted to rotate therewith in a given plane, and means for presenting tape to said drum with its longitudinal axis parallel to said plane. Means are also provided adjacent the transducer for venting air from the air cushion between the rotating drum and the tape at the region of the transducer to bring the tape closer to the face of the transducer and at least one groove formed on the face of the transducer is used for venting air from the cushion between the transducer and tape.

8 Claims, 11 Drawing Figures

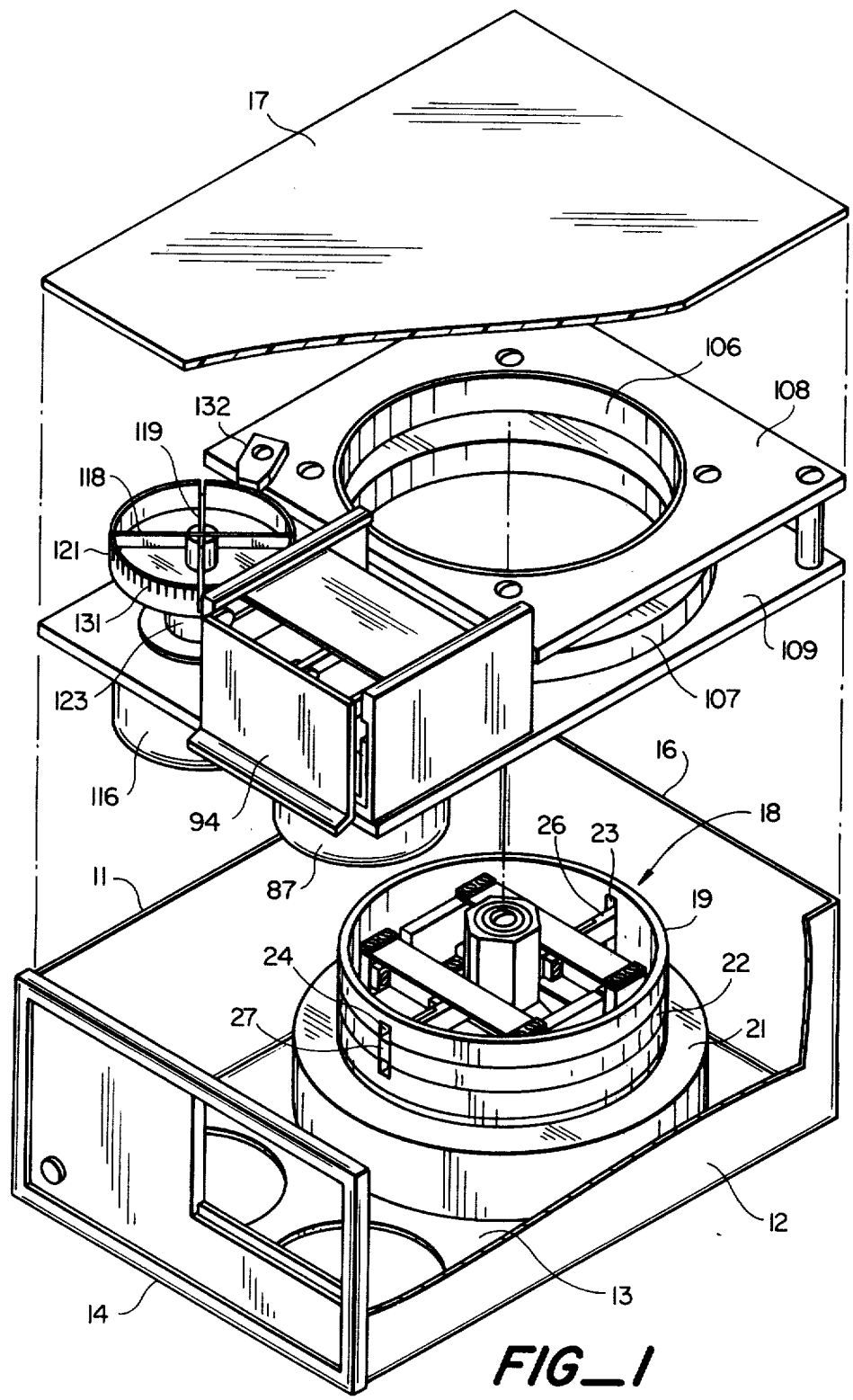
FIG_1

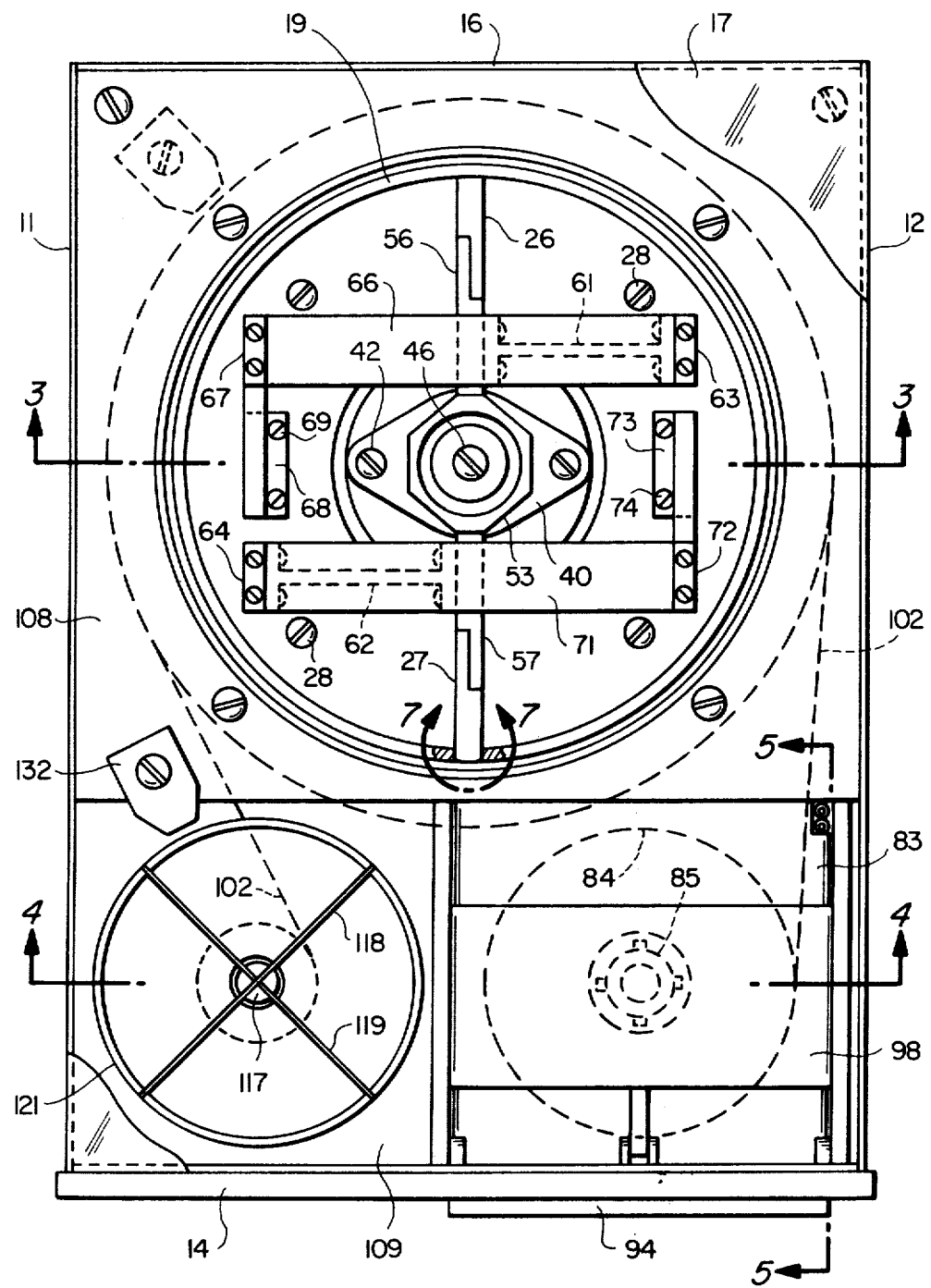
FIG_2

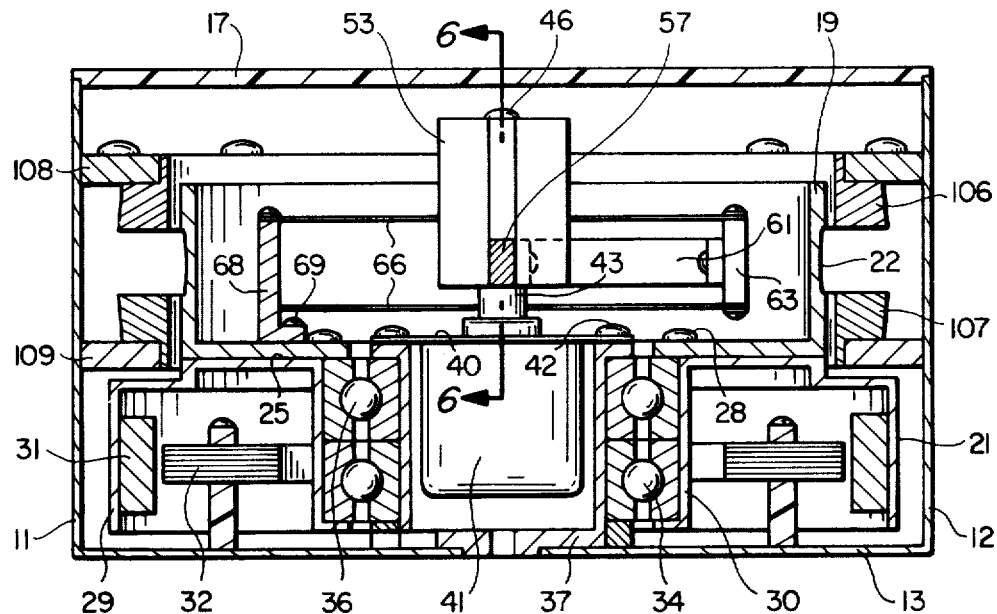
FIG_3
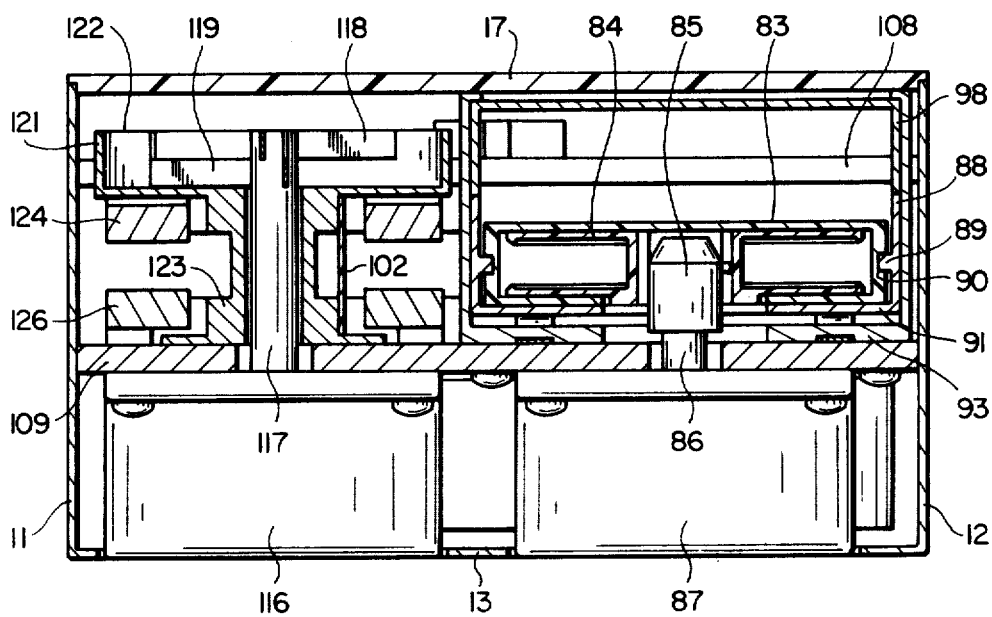
FIG_4

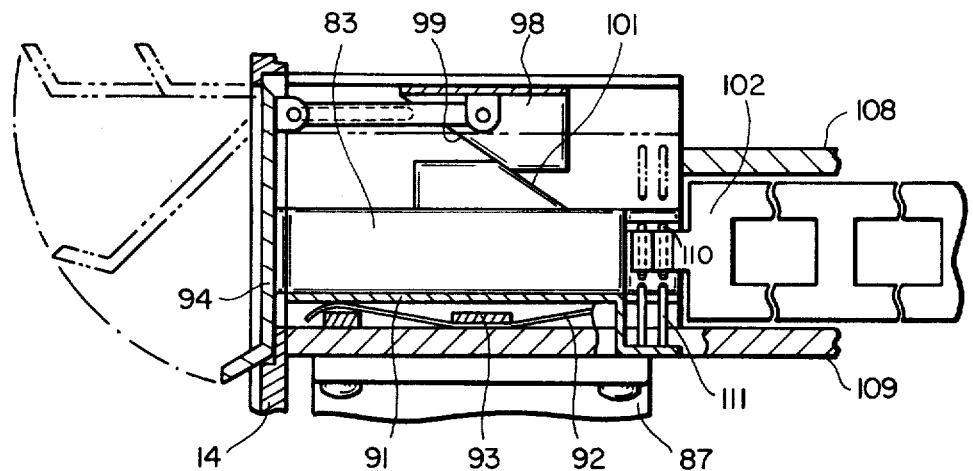
FIG_5
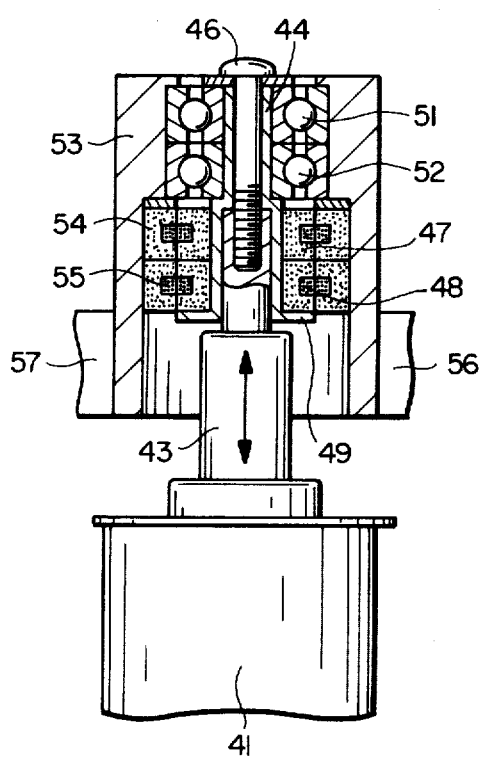
FIG_6
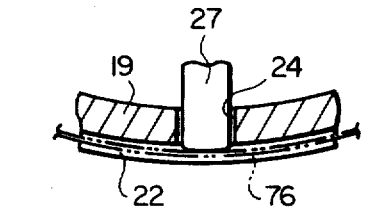
FIG 7
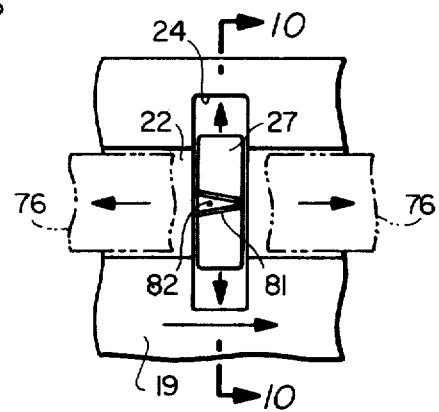
FIG_8

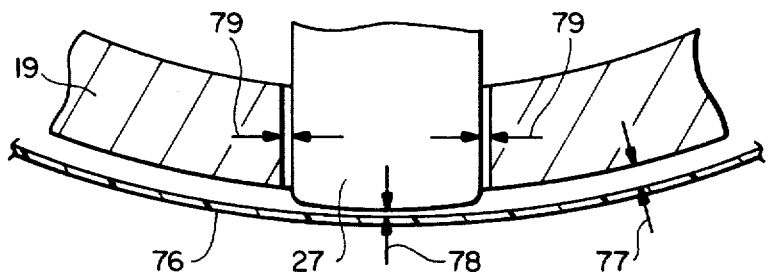
FIG_9
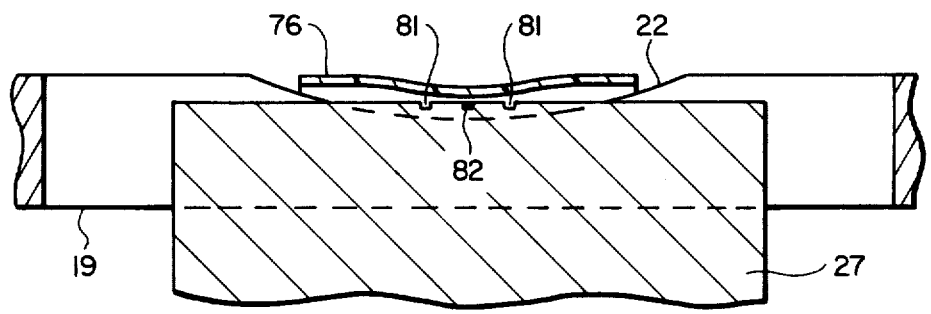
FIG_10
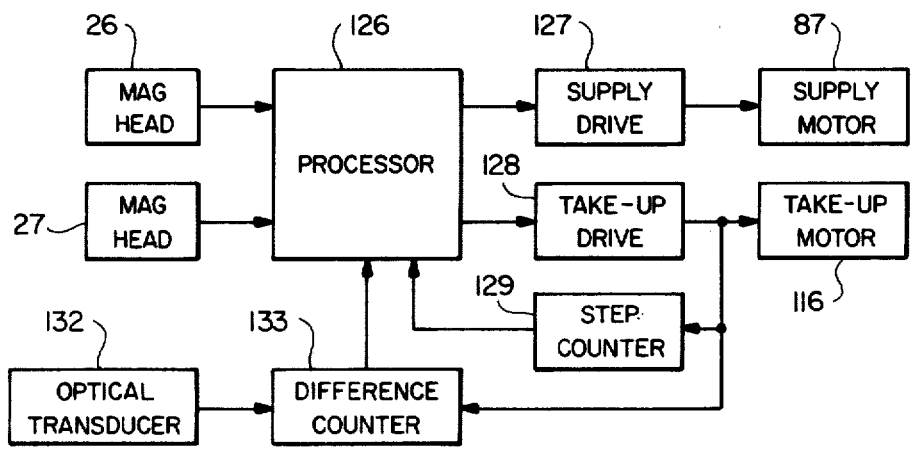
FIG_11

MAGNETIC TAPE APPARATUS

This invention relates to a tape apparatus and more particularly to a magnetic tape apparatus for recording and reproducing longitudinally disposed record blocks or pages of parallel multiple tracks of predetermined length on the magnetic tape.

In copending application Ser. No. 45,215, filed June 4, 1979, now U.S. Pat. No. 4,285,016, assigned to the same assignee, there is shown and described a tape apparatus for recording and reproducing longitudinally disposed record blocks of parallel multiple tracks of predetermined length. The apparatus includes a rotating drum and means for presenting predetermined lengths of tape to said drum. The rotating drum supports the tape on a self generating air bearing. Magnetic heads extend from the drum to rotate with the drum and cooperate with the tape to record on and reproduce from the tape. The heads are movable longitudinally to record a plurality of adjacent tracks. The length of the tracks depends upon the amount of wrap of the tape about the drum and the spacing of the magnetic heads or transducers. The plurality of spaced tracks of predetermined length form longitudinally disposed record blocks or pages.

It is an object of the present invention to provide an improved magnetic tape drive apparatus of the above character.

It is another object of the present invention to provide an apparatus in which the tape is maintained on the drum with predetermined tension in cooperation with the self generating air bearing.

It is a further object of the present invention to provide a self compensating head guide assembly.

It is a further object of the present invention to provide a self-threading single reel magnetic tape drive apparatus.

It is a further object of the invention to provide a coaxial transformer assembly for transmitting signals from rotating heads to associated apparatus.

These and other objects of the invention are achieved by a tape drive apparatus including a drum, means for rotating said drum, at least one transducer extending from the surface of the drum and adapted to rotate therewith, means for moving said transducer longitudinally along said drum, means for supplying tape to said drum including supply and take-up motors adapted to drive supply and take-up reels, means for presenting said supply reel to a drive means driven by said supply motor, means including torsion spring means for driving said take-up reel from said take-up motor to control the tension of the tape on said drum. Other objects are achieved by an improved rotary transformer, guide means for guiding the heads in longitudinal movement, and a single reel self threading arrangment.

The invention will be more clearly understood from the following description with reference to the accompanying drawings in which:

FIG. 1 is an exploded view of tape apparatus in accordance with the present invention.

FIG. 2 is a plan view of the tape apparatus of the present invention.

FIG. 3 is a sectional view taken along the line 3—3 of FIG. 2.

FIG. 4 is a sectional view taken along the line 4—4 of FIG. 2.

FIG. 5 is a sectional view taken along the line 5—5 of FIG. 2.

FIG. 6 is a sectional view taken along the line 6—6 of FIG. 3.

FIG. 7 is a view taken along the line 7—7 of FIG. 2.

FIG. 8 is a front view of FIG. 7 showing the face of a magnetic transducer.

FIG. 9 is an enlarged view of FIG. 7.

FIG. 10 is an enlarged view taken along the line 10—10 of FIG. 8.

FIG. 11 is a block diagram of the take-up and supply motor control.

The magnetic tape drive apparatus is disposed in a housing which includes a U-shaped sheet metal portion having upstanding sides 11 and 12 and bottom 13. The front panel 14 accommodates one end of the U-shaped housing portion while a rear panel 16 is suitably attached to the back to form a box-like enclosure. A transparent top 17 is suitably secured to the upper edges of the sides 11 and 12 and back 17 and is accommodated by the front panel.

The bottom 13 is adapted to support a drum assembly 18 which includes a cup-shaped drum 19 attached to a support and drive member 21. The drum includes a concave tape receiving groove 22 seen in more detail in FIG. 3. The drum includes a pair of slots 23 and 24 adapted to receive magnetic transducer assemblies or heads 26 and 27 and permits longitudinal movement of the heads.

The drive member 21 has an upper surface 25, FIG. 3, to which the drive drum 19 is suitably secured as, for example, by screws 28. The member includes sides 29 and 30 forming a U-shaped housing. The side 29 carries a plurality of spaced permanent magnets 31 which cooperate with armature members 32 whereby when the armature member is electrically energized, it causes the support and drive member 21 to rotate at a predetermined rotational velocity to, in turn, rotate the drum 19.

The complete drum and support assembly is carried by spaced bearings 34 and 36 with the outer race of the bearings suitably secured to the side 30 and the inner race carried by cylindrical support member 37 which is suitably attached to the bottom wall 13 whereby to support the assembly and permit rotation of the drum and support.

A linear drive motor 41 is secured to a plate 40, in turn, secured to the cylindrical member 37 by screws 42. The linear motor 41 has its actuator 43 extending upwardly and engaging the magnetic transducer or head drive and guide assembly. Referring to FIG. 6, the actuator shaft 43 is shown secured to a transformer and bearing support sleeve 44 by means of a screw 46. Stationary rotary transformer cores 47 with windings 48 are carried by the lower portion of the sleeve 44 and held by the lip 49. The upper portion of the sleeve is adapted to receive the inner race of the bearings 51 and 52. The outer race of the bearings receives the cylindrical head driving and mounting sleeve 53 which supports the rotating transformer cores 54 and windings 55 of the rotary transformer whereby digital signals may be applied to and received from the rotating heads.

Referring now more particularly to FIGS. 2 and 3, the head assemblies 26 and 27 are supported by arms 56 and 57 secured to and extending outwardly from the sleeve 53. The arm supports are connected to I-beams 61 and 62. The outer end of the I-beams are suitably secured to mounting plates 63 and 64, respectively. Spaced leaf springs 66 are attached to the ends of the plate 63, extend past and straddle the I-beam 61 and are secured to opposite sides of a mounting plate 67 supported by a mounting member 68 suitably attached to the bottom of the drum 19 as, for example, by screws 69. A similar arrangement is connected to the other arm and includes parallel springs 71 having one end secured to the plate 64, extending outwardly to straddle the I-beam 62 secured to a plate 72, in turn supported at their other end by support 73 suitably attached to the drum by screws 74. This arrangement forms a parallelogram which permits the arms 56 and 57 to move vertically up and down but which prevents any lateral or other movement to accurately and precisely guide the heads 26 and 27 in longitudinal travel in the slots 23 and 24. This assures no tilting of the head assembly and assures that the heads can track closely spaced tracks formed in the record blocks.

Referring particularly to FIGS. 7-10, one of the heads 27 is shown extending through the drum 24 past the outer surface of the groove to cooperate with a magnetic tape 76. The arrows in FIG. 8 show the movement of the head in a longitudinal direction along the surface of the drum movement of the tape on the periphery of the drum in the groove and the rotating movement of the drum. As will be presently described, the tape is held stationary on the surface of the drum as the drum rotates at high velocity thereby providing an air bearing for supporting the tape adjacent the rotating head. As is known the tape will be spaced from the drum because of the air bearing. Even with the head extending beyond the surface of the groove 22 it does not move closely adjacent the tape. For example, in a typical drum with one pound of tension for each inch width of tape the air gap between the drum and tape may be in the order of 0.001 inches, arrows 77 of FIG. 9. The air gap from the head surface may be about 0.0002 inches, arrows 78 of FIG. 9. However, for high density or high frequency recording this air gap is excessive. In accordance with the present invention, air vent means are provided to minimize the air gap. One such vent comprises the space between the head 27 and drum 19, arrows 78 of FIG. 9. This is about 0.004 inches to provide some venting and maintain the tape close to the head. In addition, we have discovered that if grooves or notches 81 are formed in the head, FIGS. 8 and 10, venting is provided and the tape cups or deflects down toward the head in area of the transducer 82, FIG. 10. This provides an air gap in the order of 0.00004 inches or less. As the head rotates, it records the longitudinal tracks on the tape and as the heads move in a longitudinal direction, records adjacent tracks with each passage of a head over the tape.

As just described, the recording apparatus of the present invention serves to record a plurality of recording blocks or pages along a magnetic tape with each of the blocks including a plurality of parallel record tracks. The recorded blocks are formed by presenting a predetermined length of tape to the surface of the rotating drum, holding the tape onto the surface with predetermined pressure whereby the drum rapidly rotates and forms an air support between the surface of the drum and the overlying tape and the magnetic heads which protrude from the surface of the drum serve to record longitudinal tracks as they engage and cooperate with the tape and rotate through 180° in the present instance. Thus, for example, head 26 records a longitudinal track followed by the recording of a longitudinal track be head 27 which may be slightly displaced from the head 26 whereby two adjacent tracks are recorded. Thereafter, the head assembly is moved by the linear drive motor 41 to record another pair of tracks. Thus, the rotating and longitudinal movement of the heads serves to record or reproduce a plurality of tracks from a block of magnetic tape. Thereafter, the tape is advanced a predetermined distance whereby to record a second block. The second block is preferably spaced from the first whereby as one goes along the tape a plurality of identifiable blocks are formed. Suitable signals are recorded on the tracks so that they may be identified within a block. The blocks may be identified by a prerecorded track which is read with a magnetic transducer or by holes formed in the tape or by optical markings which are sensed by photoelectric means to thereby aid in identifying and positioning each block onto the drum. Other means such as magnetic means may be employed for indexing the tape. In any event, means are associated with the tape for moving the tape from a supply reel, placing the tape on a take-up reel and vice versa, whereby the tape can be moved in either longitudinal direction over the drum to index a particular selected block.

In accordance with one feature of the present invention, the tape is a single reel disposed in a box-like housing, that is, the housing contains only the supply reel. Means are provided for engaging the end of the tape in the supply reel, guiding it over the surface of the rotating drum, and winding it onto a permanently mounted take-up reel.

Referring now particularly to FIGS. 2, 4 and 5, the tape drive portion of the apparatus is described and explained in more detail. The tape housing 83 accommodates a reel 84. In FIG. 4 the housing is shown in cooperative relationship with a drive spindle 85 secured to the shaft 86 of drive motor 87. Drive motor 87 may, for example, be a stepping motor and serves to rotate the reel 84 to wind tape from the take-up reel onto the supply reel. The tape housing 83 is placed in a U-shaped tray 88 which is provided with a key 89 which cooperates with a keyway 90 in the reel housing to permit longitudinal sliding movement of the reel in and out of the tray but which retains the reel on the tray bottom 91. The reel support tray is urged upwardly by a spring 92 secured to plate 93, FIG. 5. The housing for the tape cartridge is provided with a door or latch 94 which may be lifted into the position shown in dotted line and urged inwardly whereby a U-shaped member 98 having surface 99 moves forward allowing the cam surfaces 101 of the tray to move upwardly under urging of the spring 92 and lift the tray upwardly to disenage the tape reel from the drive spindle whereby the reel housing may be removed and a new reel inserted in the apparatus. Thereafter, the handle 94 is drawn outwardly to cam the tray downwardly against the force of the spring and closed as shown in solid line in FIG. 5.

In accordance with one feature of the invention, the end of the tape is provided with spaced pins 100 to prevent the tape from being fully wound into the housing and which are located at one corner edge of the cartridge. When the tray is moved downwardly, the pins are adapted to engage the ends of a tape leader 102 which has its other end attached to the take-up reel whereby as the take-up reel is rotated, the tape is drawn from the housing into cooperative relationship with the rotating drum and wound onto the take-up reel. The leader 102 is shown in dotted line in FIG. 2 extending from the take-up reel to the supply reel. The leader is guided between the reels and out of contact with the drum by means of two spaced ring-shaped member 106 and 107 but which are secured to spaced walls 108 and 109. The spaced members serve to guide the tape into cooperation with the drum after the wider leader is retracted and wound onto the take-up reel. This arrangement prevents contact of the take-up leader with the drum surface thereby assuring no damage to the concave tape receiving surface of the drum 19. When the tray is lifted after all of the tape is rewound thereon, the leader 102 is, of course, adjacent the cartridge. As the tray is lifted upwardly, a pair of spaced pins 111 engage and hold the leader. Thus, after a new cartridge is inserted and moved downwardly, the retaining pins 11 are retracted while a new set of pins from the new tape engage the end of the leader in a manner just described.

The take-up reel is driven by a motor 116 having upwardly extending shaft 117. The shaft 117 is slotted at its ends and serves to receive a pair of linear spring members 118 and 119. Ends of the spring members are connected to the upwardly extending sides 121 of cup-shaped member 122. The cup-shaped member has a downwardly extending cylindrical portion which forms the take-up reel for the assembly. Therefore, as the motor 116 is energized to rotate shaft 117, the springs flex and rotate the take-up reel 123. Spaced guides 124 and 126 support the tape as it is reeled or wound onto the take-up hub.

As previously described, the motors 86 and 116 are energized to bring predetermined blocks of the tape adjacent the recording drum 19. Referring to FIG. 11, a block diagram of a suitable tape control system is shown. The rotating magnetic heads (optical readers) read the block identification from the tape and apply the information to a processor 126 which applies signals to the motor drives 127 and 128 to bring the selected block or page into cooperation with the drum. In order to achieve consistent spacing between the heads and tape the tape tension is controlled. The tension control is achieved by rotating the take-up reel a predetermined angular amount after the tape is located. However, depending on the diameter of the tape on the take-up reel a predetermind angular rotation will provide different tension. In accordance with a feature of the present invention the amount of rotation, steps of the stepping motor is controlled.

A step counter 129 maintains a count of the number of steps the take-up reel has taken to wind tape thereon. Of course, the count increases or decreases depending upon the direction of rotation. This count is fed to the processor which contains a look-up table whereby to provide an indication of tape movement (tension) in each step.

The take-up reel is provided with equally spaced markings 131, FIG. 1, which are read by an optical transducer 132. The output of this transducer is fed to a difference counter 133 which receives a stepping signal. The difference signal is also applied to the processor 126 which then provides the proper number of pulses to the stepping motor to achieve the desired constant tension regardless of block location along the tape.

Thus, there has been provided an improved magnetic tape drive apparatus which permits the use of single reels in digital recording, which provides high recording density, large data storage capability because of the multiple blocks on the tape. In essence, each block will carry substantial information and with tape of suitable width will carry as much information as a floppy disc.

What is claimed is:

1. A magnetic tape apparatus comprising a drum, means for supporting and rotating said drum, at least one transducer mounted to rotate with said drum and extending past the surface of said drum through a slot formed in said drum, means comprising a take-up means for presenting a selected length of tape to said drum so that the transducer scans along longitudinal tracks as it rotates past said tape, means for moving said transducer longitudinally along said slot so that it moves along a plurality of laterally spaced tracks formed along said tape, said means including a leafspring assembly including a pair of leafsprings with their major surfaces disposed perpendicular to the direction of travel of said head whereby said springs can flex to permit movement of the head along said slot but are rigid to prevent lateral movement of the head.

2. Magnetic tape apparatus as in claim 1 including means providing a predetermined tension to said tape.

3. Magnetic tape apparatus as in claim 2 wherein said means for presenting selected lengths of tape to said drum include a supply reel and take-up means for moving tape between the supply reel and the take-up means over said drum and said means for providing predetermined tension includes means for moving the take-up means after said selected length of tape has been presented to the drum an amount dependent upon the position of said selected length on the tape.

4. Magnetic tape apparatus as in claim 3 wherein said take-up means includes a take-up reel driven via a torsion spring means by a stepping motor, and said means for moving the take-up means after said selected length of tape is presented includes means for stepping said motor an amount which is related to the amount of tape on said take-up reel.

5. A magnetic tape apparatus as in claim 4 wherein said last named means includes means for sensing the amount of rotation of the take up reel responsive to each step of the stepping motor.

6. A magnetic tape apparatus as in claim 5 including means for venting said air cushion adjacent said transducer to permit the tape to be positioned closer to said transducer and vent means on the face of said transducer to allow a portion of said tape to extend close to the transducer.

7. Magnetic tape apparatus as in claim 1 including a rotary transformer for supplying and receiving transducer signals.

8. Magnetic tape apparatus as in claim 7 wherein said rotary transformer includes a stationary core portion including a winding and a rotating core portion including a winding magnetically coupled to one another.

* * * * *